Feb. 22, 1966 H. E. KLINGLER Re. 25,954

TEMPERATURE MIXING AND DIVERTING VALVE FOR DOMESTIC PLUMBING FIXTURES

Original Filed Jan. 23, 1964 3 Sheets-Sheet 1

INVENTOR.
Hughlin E Klingler
BY
Otto A Earl
ATTORNEY.

Feb. 22, 1966 H. E. KLINGLER Re. 25,954
TEMPERATURE MIXING AND DIVERTING VALVE FOR DOMESTIC PLUMBING FIXTURES
Original Filed Jan. 23, 1964 3 Sheets-Sheet 2
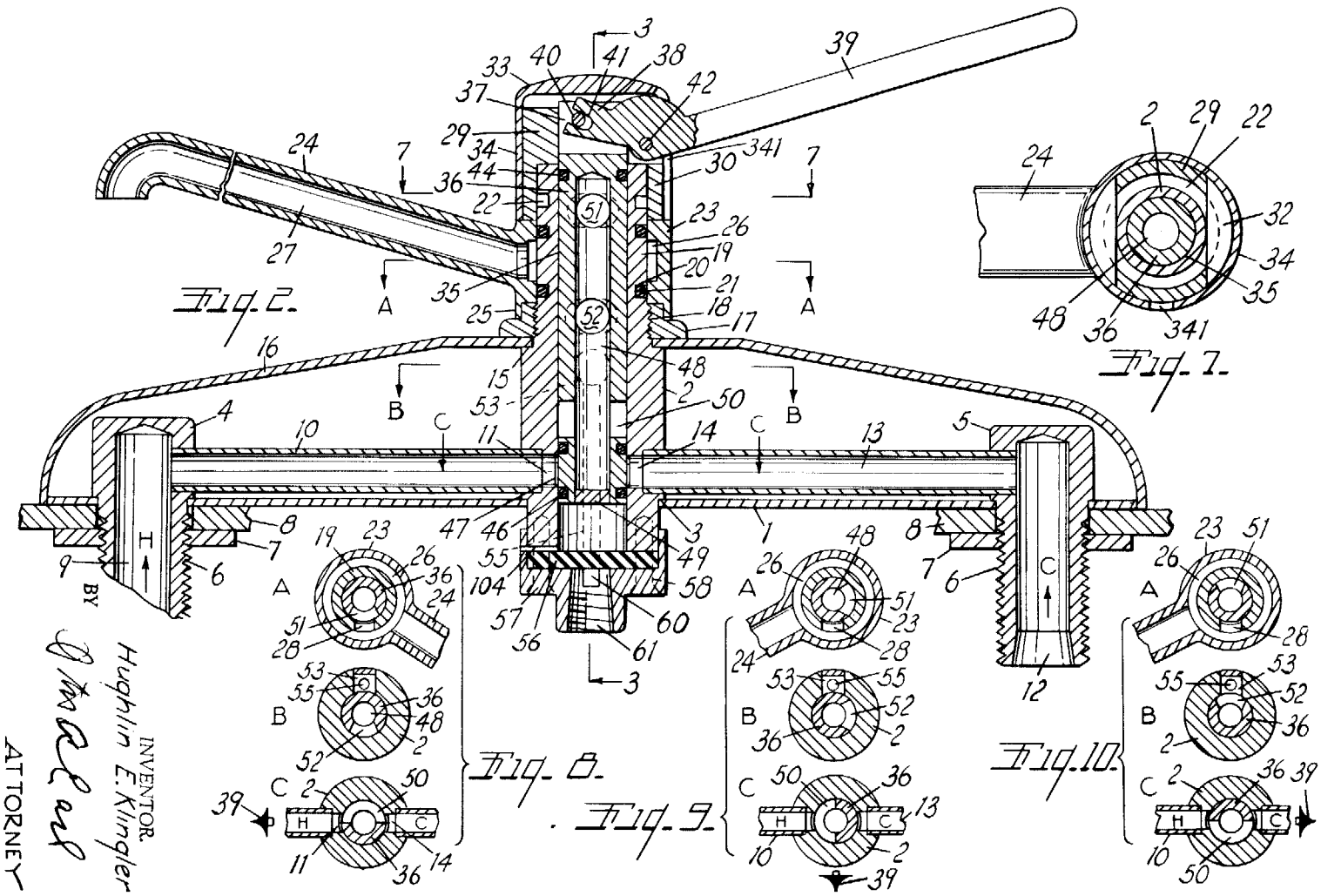
INVENTOR.
Hughlin E. Klingler
BY
ATTORNEY Feb. 22, 1966 H. E. KLINGLER Re. 25,954

TEMPERATURE MIXING AND DIVERTING VALVE FOR DOMESTIC PLUMBING FIXTURES

Original Filed Jan. 23, 1964 3 Sheets-Sheet 3

INVENTOR.
Hughlin E. Klingler
BY
Attorney
ATTORNEY.

United States Patent Office

Re. 25,954
Reissued Feb. 22, 1966

25,954

TEMPERATURE MIXING AND DIVERTING VALVE FOR DOMESTIC PLUMBING FIXTURES

Hughlin E. Klingler, 223 Arcade Ave., Elkhart, Ind.

Original No. 3,168,112, dated Feb. 2, 1965, Ser. No. 339,641, Jan. 23, 1964. Application for reissue Apr. 19, 1965, Ser. No. 457,894
22 Claims. (Cl. 137—625.17)

Matter enclosed in heavy brackets [ ] appears in the original patent but forms no part of this reissue specification; matter printed in italics indicates the additions made by reissue.

This invention relates to improvements in temperature mixing and diverting valve for domestic plumbing fixtures. This application is a continuation in part of my copending application, Serial No. 169,551, *now Patent No. 3,168,109,* filed January 29, 1962 for Domestic Plumbing Fixtures. The principal objects of this invention are:

First, to provide a temperature mixing and diverting valve in which manipulation of a single handle will selectively vary the temperature of water received into the valve and selectively direct the mixed water to either of two outlets such as a faucet or spray nozzle in a sink fixture or to a tub nozzle or shower outlet in a tub fixture.

Second, to provide a temperature mixing and diverting valve which is extremely simple and inexpensive to manufacture and in which there is little or no wear between the sealing parts of the valve so that the valve is long lived.

Third, to provide a valve having the foregoing properties which is extremely simple to assemble and disassemble should any adjustment or repairs be necessary.

Fourth, to provide a novel form of valve body, core, operating handle and cap assembly in which a hand lever operated core and the lever therefor are operatively retained on the valve body by a simple cap and key arrangement with the cap frictionally retained in place on the assembly.

Fifth, to provide a mixing and diverting valve in which the major components including the body and core of the valve can be economically produced with the necessary degree of accuracy as screw machine parts and with very little alteration or other machine operations on the parts.

Sixth, to provide a mixing and diverting valve in which the adjustable core for selecting the mixture and the direction of flow of the water through the valve is balanced by water pressure in the valve so as to retain its adjusted position at all times.

Seventh, to provide a mixing and diverting valve which will not only adjust the mixture of hot and cold water and the direction of delivery of the water between two different outlets but which will further adjust the volume of water delivered in any mixing and directing adjustment of the valve.

Eighth, to provide a mixing and diverting valve which can be closed by rotating the valve to either of two angularly adjusted positions at the ends of the temperature mixing adjustments or by moving the valve axially to shut off the supply of water to the valve so that the valve may be left in a preadjusted desired temperature mixture position and turned off without varying the preset mixture setting.

Ninth, to provide a mixing and diverting valve particularly adapted for use as a tub and shower control in which the valve may be easily and quickly closed by merely pushing on the operating handle in a single central position in the event that the supply of hot water should suddenly increase and create a danger of burning the bather.

Other objects and advantages of the invention will be apparent from a consideration of the following description and claims. The drawings, of which there are three sheets, illustrate a first form of the valve adapted as a swing faucet and spray nozzle fixture for a kitchen sink and a second form of the valve adapted as a bath tub and shower control valve.

FIG. 1 is a fragmentary top plan view of the sink faucet valve arrangement.

FIG. 2 is a vertical cross sectional view taken along the plane of the line 2—2 in FIG. 1 showing the valve in one adjusted position in which the flow of water is positively cut off from the supply connections and is further shut off by positioning of the delivery ports out of registry with the two alternate flow passages of the valve. The swing spout to the sink is in a different adjusted position than in FIG. 1.

FIG. 7 is a fragmentary horizontal cross sectional view taken along the plane of the line 7—7 in FIG. 2 and showing the rotatable retaining connection between the valve body and the bearing block of FIG. 6 as viewed in FIG. 6.

FIG. 8 is a composite view of three cross sections of the valve taken along the planes of the lines A—A, B—B and C—C showing the corresponding position of the parts at the three planes in one adjusted position of the valve.

FIG. 9 is a composite view of three cross sections corresponding to FIG. 8 but showing the parts of the valve in a second adjusted position.

FIG. 10 is a composite view of three cross sections corresponding to FIG. 8 and showing the valve parts in a third adjusted position. In FIGS. 8, 9 and 10 the dark arrow indicates the corresponding direction of the handle of the valve.

Figure 1:
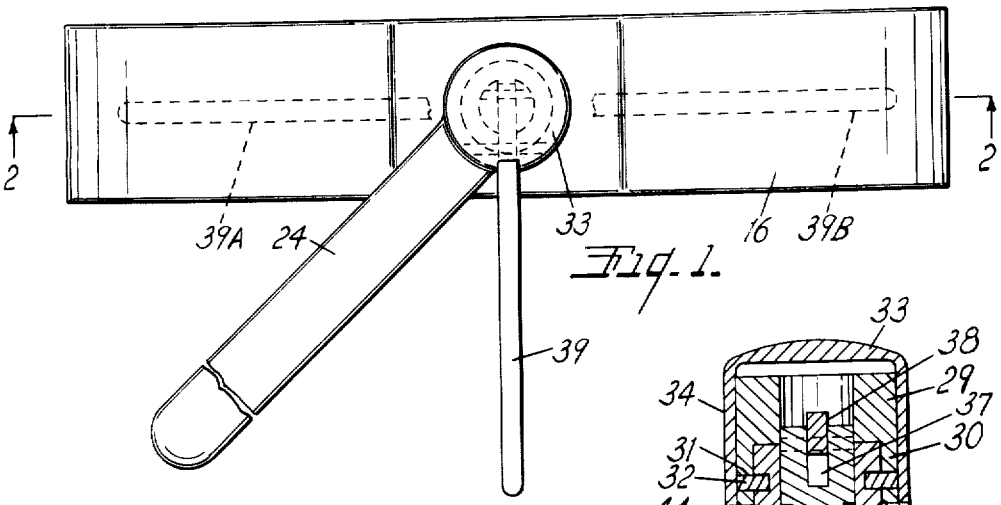
Figure 5:
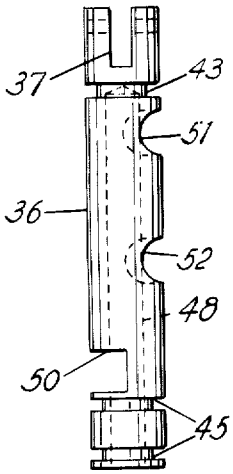
FIG. 5 is a side elevational view of the valve core in the same relative position as in FIG. 3.

The first form of the mixing and diverting valve shown in FIGS. 1 to 11 shows the sink swing faucet and spray nozzle form of the valve assembled on a mounting plate 1. In its center the plate has an opening passing the lower end of the valve body 2 with a shoulder 3 resting on the mounting plate. Spaced laterally on each side of the body 2 are a pair of mounting connectors 4 and 5 having downwardly extending necks 6 supported on the mounting plate and provided with nuts 7 for clamping the mounting plate to the top surface of a sink panel 8. The left mounting connector 4 has an inlet passage 9 formed vertically therein and is adapted by the threads on the outside for connection to a hot water supply pipe. A connecting hot water pipe 10 extends from the side of the mounting connector to the side of the valve body 2 where it opens into a first or hot water inlet port 11. The right mounting connector 5 has an inlet passage 12 for cold water formed therein and is adapted for connection to a cold water pipe. The passage 12 communicates through the lateral connecting pipe 13 with the side of the valve body 2 opening thereinto through the cold water inlet port 14. Above the connecting pipes 10 and 13 the body 2 is provided with an upwardly facing shoulder 15 which rests on the underside of a downwardly concave escutcheon or cover member 16. The cover member is held in place by a nut 17 engaged with the threads 18 formed on the valve body above the shoulder 15.

Above the threaded portion 18 the valve body has a cylindrical portion 19 with grooves 20 formed on the upper and lower sides thereof for the reception of O-ring or other packing seals 21. Above the upper groove 20 the body is provided with a third annular groove 22 constituting a key retaining groove as will be described. The O-ring seals 21 seal annularly around the inside of an annular end 23 on the swing faucet 24. Desirably, but not necessarily, the annular end 23 is provided with a depending skirt 25 covering the upper portion of the nut 17. The annular end 23 has an internal annular groove 26 formed therein opening to the delivery passage 27 of the faucet and further registering with an outlet port 28 formed in the front of the valve body. (See FIGS. 3 and 4.) The annular end 23 of the swing faucet is retained on the valve body and against the nut 17 by means of a bearing block member 29 which fits over the upper end of the valve body and has a depending cylindrical flange 30 resting on top of the end of the swing faucet. The bearing block 29 has opposite chrodal slots 31 cut horizontally therethrough opposite the groove 22 in the valve body and arcuate segmental keys 32 are positioned through the slots 31 and into the groove 22 to prevent axial removal of the bearing block from the valve body while permitting rotation of the bearing block around the valve body. The keys 32 are retained in place by an inverted cup-shaped cap 33 having a depending cylindrical flange 34 which is pressed downwardly over the bearing block and over the outer edges of the keys. The flange 34 has a frictional holding engagement with the sides of the bearing block but is easily vertically removable therefrom.

Rotatably and vertically reciprocably mounted within the tubular bore 35 which extends completely through the valve body is a cylindrical valve core 36 which has a tight sealing but sliding engagement with the inside of the bore. The upper end of the valve core 36 is vertically and diametrically slotted as at 37 to receive the inner end 38 of the operating handle 39. A cross pin 40 extending between the opposite sides of the slot in the core is received in an elongated notch 41 in the inner end of the handle to reciprocate the core. The handle is pivotally mounted on the horizontal pin 42 supported in the cross bore 431 in the bearing block 29. The bearing block is also vertically slotted at 441 on one side to receive the central portion of the handle. It is thus possible to rotate the core 36, bearing block 29, keys 32, and the cap 33 by rotation of the outer end of the handle 39 and to vertically reciprocate the core 36 within the valve body by upward and downward movement of the handle 39. Various rotated positions of the handle 39 are shown in dotted lines at 39A and 39B in FIG. 1.

The core 36 is a cylindrical member closely fitting within the bore 35 in the body. The core has an upper external annular groove 43 receiving an O-ring seal 44 sealing the upper end of the core within the bore. At its lower end the core has a pair of axially spaced annular grooves 45 holding O-ring seals 46 that are adapted to move vertically to positions on opposite sides of the inlet ports 11 and 14 as shown in FIG. 2 when the valve is raised in closed position. The edges of the ports 11 and 14 are desirably tapered or chamfered as at 47 so as to permit the upper ring 46 to slide easily over the ports as the core is lowered to open position.

Figure 3:
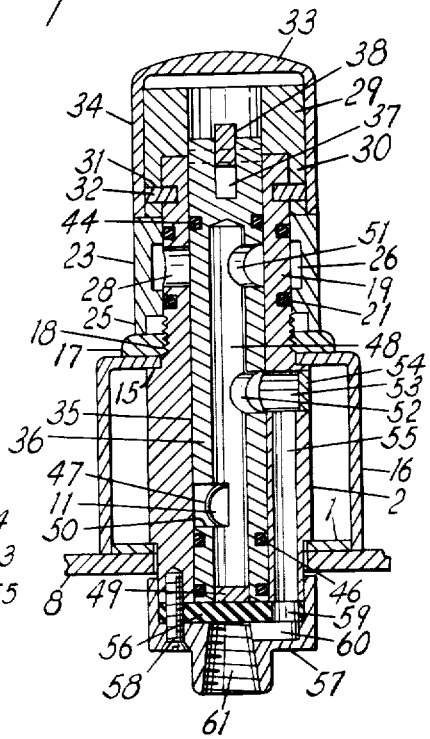
FIG. 3 is a fragmentary vertical cross sectional view taken along the plane of the line 3—3 in FIG. 2 showing the valve core and operating handle in a different adjusted position to divert or direct a mixture of hot and cold water to a spray nozzle connection.
Figure 6:
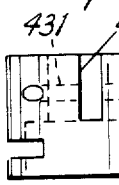
FIG. 6 is a side elevational view of the core and handle bearing block in the same position as in FIG. 3.

The core 36 defines a central cylindrical bore 48 which is terminated or closed at the top and after formation is closed a tthe bottom by the plug 49. Just above the lower pair of O-ring seals 46 the core is provided with a diametrical chordal slot 50 which may be moved axially into registry with the inlet ports as shown in FIG. 3 and which may be further rotated into selective registry with the closed ports as shown in the composite views in FIGS. 8, 9 and 10. Above the slot 50 the core 36 is provided with a top or first flow opening 51 which diverges outwardly from the bore 48 to the side of the core and a lower or second flow opening 52 of similar shape spaced below the upper opening 51 and on the same side of the core as the opening 51. The flow openings 51 and 52 are on the diametrically opposed side of the core from the chordal slot 50.

The flow openings 51 and 52 are spaced so as to move into vertical registry with the first port or flow passage 28 in the body 2 and a second or diverted outlet port 53 formed in the opposite side of the body 2 and below the first outlet port 28. The outlet port 53 is conveniently formed by drilling into the side of the body and closing the end of the hole with a plug 54. The second or diverted outlet port 53 communicates with a vertical diverted flow passage 55 cored or drilled into the bottom of the body 2 alongside of the main central bore 35.

When the core is assembled in the body a gasket 56 is secured over the lower end of the body by a bottom cap 57 held in place by screws 58. The gasket 56 has a hole 59 formed therein registering with the diverted flow passage 55 and opening into a lateral recess 60 in the cap which communicates with a threaded connection 61 for a diverted flow conduit such as a spray nozzle hose not illustrated in the drawings.

From the foregoing construction, it will be seen that the core 36 can be vertically and rotatably adjusted within the body 2 to selectively position the outlet ports 51 and 52 in various relationships to the passages as ports in the body 2. When the core is raised as in FIG. 2, no water may enter the core, being blocked by the lower end of the core between the O-ring seals 46. Lowering of the core progessively registers the slot 50 with one or both of the inlet ports 11 and 14 and thus constitutes a shut-off and volume control for the valve. With the core fully lowered as in FIG. 3, various arrangements and relationships between the ports may be provided as shown in FIGS. 8, 9 and 10 in which the angularly rotated position of the handle 39 is conventionally illustrated by the arrow. In FIG. 8 the slot 50 opens half way to each of the inlet ports 11 and 14 so that a half and half mixture of hot and cold water enters the bore in the core 36. In this position the lower outlet port 52 opens against the blank side of the body 2 and the diverted outlet port 53 and the flow passage 55 are blocked from receiving water by the close sliding fit between the core and the bore in the body. However, the upper outlet port 51 is in vertical registry with the first outlet port 28 so that the mixture of water is delivered to the annular passage 26 and the swing faucet spout 24.

When the handle 39 is moved to the front as appears in FIGS. 1 and 9, the slot 50 opens solely to the hot water inlet while the back of the core closes off the cold water inlet. The lower outlet port 52 is closed by the side of the valve body as is the upper outlet port 51 so that no water is delivered to either the faucet or the spray outlet even though hot water is available in the central bore 48 of the core. This is a secondary shut-off position of the valve independent of the vertical adjustment of the valve core.

When the core or handle 39 is rotated to the right as shown in FIG. 10, the slot 50 again opens equally to the hot and cold inlets when the lower diverted outlet port 52 is in registry with the diverted port 53 and the diverted flow passage 55. The upper outlet port 51 is blocked by the side of the valve body so no water is delivered to the faucet 24.

Figure 11:
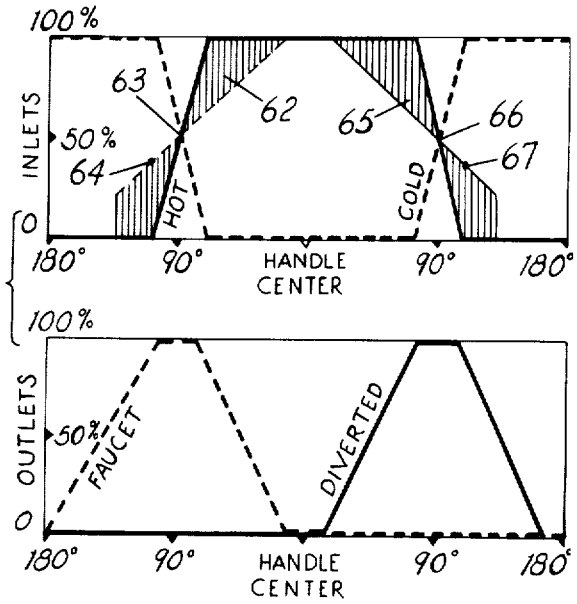
FIG. 11 is a composite view showing two valve position diagrams of the inlet valves and the outlet valves in various adjusted positions of the valve handle.

It will be noted that the outlet ports 51 and 52 taper outwardly to cover approximately 72° of the circumference of the valve core so that rotation of the core will progressively register the ports 51 and 52 with the ports 53 and 28. The valve diagrams appearing in FIG. 11 show the mixtures and directions of flow available with this arrangement of ports. With the handle in front center position the hot inlet port 11 is fully open and remains fully open through a substantial angular rotation of the core in either direction. At the same time, the cold inlet port is closed. The outlets appearing in the bottom valve chart appearing in FIG. 11 are both closed for a relatively angular adjustment of the handle 31. As the handle is moved clockwise or to the left, the faucet outlet valve 51 moves progressively into registry with the outlet port 28 to a fully opened position for a short angular space at 90° rotation of the handle. As the handle is moved further toward the rear, the faucet outlet port commences to close until it is again closed at 180° rearward rotation. Conversely counterclockwise rotation of the handle 39 from the central front position shortly starts to open the diverted flow port 52 to the port 53 increasing to a maximum for a short distance at 90° rotation and then closing to fully closed position at 180° rotation. The combination of the openings of these outlet ports and the inlet ports provides for a flow of water to the faucet indicated by the hatched areas at 62 in the upper diagram of FIG. 11, which starts out as hot and is progressively mixed with cold water for a tempered delivery starting at the point 63 where the hot and cold inlets are equally open and continuing to the point 64 where the hot inlet is fully closed. A full cold flow is obtained by further rearward rotation of the handle but this is stopped in many installations due to the inability of the handle to rotate back against the backsplash or wall behind the faucet.

When the handle is moved counterclockwise or to the right, the flow is delivered through the opening diverted flow port 53 and passage 55 with a flow indicated by the hatched area 65 in the upper diagram in FIG. 11 that is first all hot and then mixed to a half and half hot and cold at 66 and becoming all cold at 67 where the hot water inlet closes. The angular relationship and registry of the several ports may, of course, be varied as desired and the valve diagrams shown in FIG. 11 show a maximum arrangement where the coacting ports register through 90 degrees of rotation of the valve core and are closed or closing during the remaining 270° rotation of the handle. With this arrangement, the faucet will receive a 50–50 mixture of hot and cold water at approximately 90° as indicated at point 68 where both the hot and cold inlets are fully opened and will not become all cold until approximately 180° rotation. The delivery to the diverted spray connection will be first hot and become a 50–50 mixture at 69 and cool progressively to all cold at 180° clockwise rotation of the handle. The form and proportion shown in the drawings and diagramed in FIG. 11 is preferred, as this provides a substantial degree of blocking of the outlet ports 51 and 52 when the ports are desired to be kept closed thus preventing leakage around the core from the ports.

Figure 15:
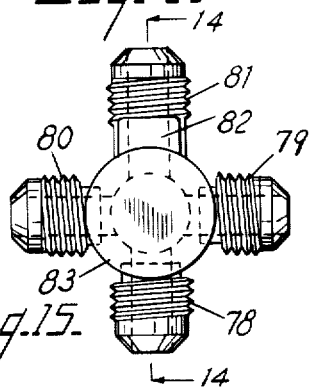
FIG. 15 is a bottom or back elevational view of the valve body shown in FIG. 14.
Figure 13:
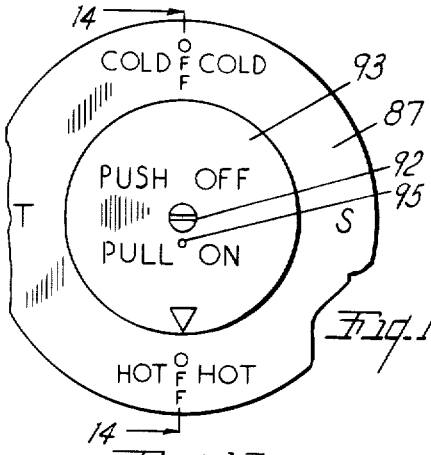
FIG. 13 is a fragmentary front elevational view of the modified form of the valve adapted particularly for tub and shower control.
Figure 14:
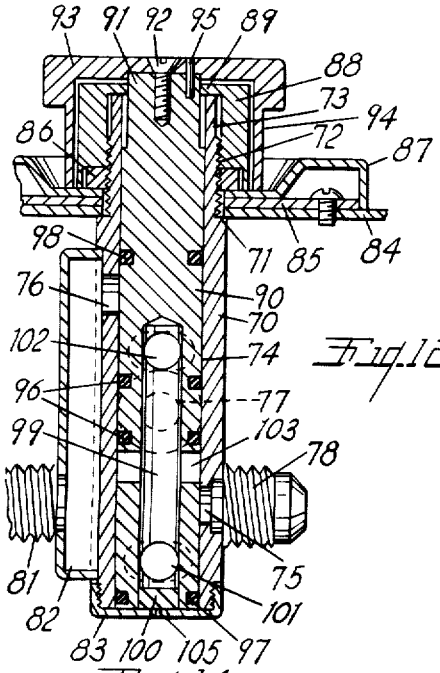
FIG. 14 is a fragmentary longitudinal cross sectional view taken along the plane of the line 14—14 in FIG. 13.
Figure 12:
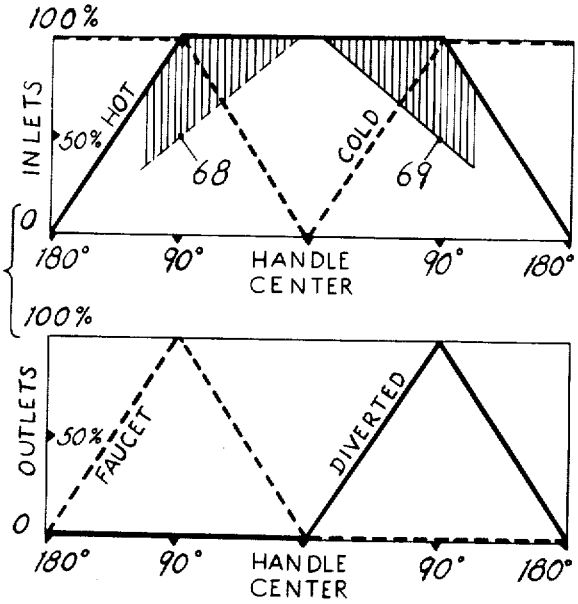
FIG. 12 is a composite view of two valve diagrams showing a possible variation of the position and proportioning of the valve openings in the valve.

The modified form of valve shown in FIGS. 13, 14 and 15 is particularly adapted for use as a tub and shower control valve. The valve consists of a tubular cylindrical body 70 having a forwardly facing shoulder or step 71 near its front or outer end with threads 72 formed forwardly of the step and a further reduced or stepped portion 73 at the extreme front of the body. The body has a straight cylindrical bore 74 extending completely therethrough and provided with a first outlet port 75 near the rear or bottom and a second diverted flow outlet port 76 spaced forwardly toward the shoulder 71. Between the ports 75 and 76 the body is provided with hot and cold inlet ports, one of which appears at 77 in FIG. 14. The inlet ports 77 and the outlet port 75 have threaded coupling members 78, 79 and 80 connected thereto and a fourth coupling connection 81 is connected to a chambered diverter flow body 82 secured to the side of the body over the second outlet port 76. Connection 79 is adapted to receive a hot water supply pipe while connection 80 receives a cold water supply pipe. Connection 78 is adapted to connect to a conduit extending downwardly to a tub faucet while connection 81 connects to a diverted flow conduit extending upwardly to a shower connection. The lower or rear end of the body 70 is closed by a threaded cap 83.

A pair of mounting plates 84 and 85 are clamped against the shoulder 71 by a nut 86 threaded on the threaded portion 72 and holding an escutcheon plate 87 to the mounting plates. Surrounding the top or forward end of the body on the opposite side of the escutcheon from the inlet and outlet connections is a bearing block element or member 88 that is threadedly engaged with the threads 72 to prevent axial motion of the bearing block and which is provided with a radially inwardly projecting flange 89 bearing against the end of the body. The flange 89 defines a central hole passing the outer end of the cylindrical core element 90. The core element 90 has a reduced outer portion 91 passing through the hole in the bearing block and engageable with the flange 81 at the end of the reduced portion to limit outward movement of the core from the body. The outer end of the core 90 is secured by the screw 92 to a circular operating handle or knob 93 having a cylindrical skirt or flange 94 slideable over the exterior of the bearing block 88. An off-center pin 95 engaged between the core and the handle assures rotation of the core by the handle.

The valve core 90 has grooves formed therein to receive a central pair of axially spaced O-ring seals 96 which are adapted to be positioned on opposite sides of the inlet connections 79 and 80 in the full off position of the valve. A lower or inner O-ring seal 97 seals the inner end of the core to the body while an outer seal 98 seals the core to the body outwardly from the port 76. The core 90 is provided with an internal bore 99 closed at the bottom or rear by a plug 100. The core defines a first divergent outlet port 101 near its rear or inner end and a second or diverted outlet port 102 near the forward end of the core and on the opposite side of the inlet connections 79 and 80. Inwardly or downwardly from the pair of seals 96 the core is provided with a transverse chordal slot 103 which is adapted to be moved axially into registry with the inlet connections or ports 77 in the same manner as the slot 50 in the first form of valve core. From the foregoing description, it will be apparent that the handle 93 and core 90 can be pushed all the way in to a positive shut-off of the inlet ports as shown in FIG. 14 or pulled outwardly for selective volume control and opening of the inlet ports to the bore in the core. In any of these axially adjusted positions the handle and core can be rotated to bring the first outlet port 101 into angular registry with the outlet connection 79 to the tub or alternatively bring the second outlet port 102 into registry with the diverted flow outlet port 76 for delivering water to the shower.

The use of a circular handle 93 instead of the lever handle 39 is a safety factor when used in conjunction with a shower control in that should the supply of cold water be accidentally cut off or the supply of hot water suddenly increased, the bather has merely to push the handle 93 in to cut off all water to prevent being burned. In other respects the two valves operate to provide the same selective mixtures and volume controls. In each valve all of the water seals are provided by reliable O-rings that slide and rotate so that there is little danger that they will become worn. Should replacement be required of any of the seals, the seals are readily accessible by simply removing the cover 38 or the handle 93 permitting access to the bearing block members 29 and 88, after which the valve cores are easily removed from the valve body. Conversely, assembly of the valve parts is extremely simple and the parts can be formed to a large extent with the desired degree of accuracy as screw machine parts. The cost of the valves is accordingly very little as compared to more complicated valve structures.

Figure 4:
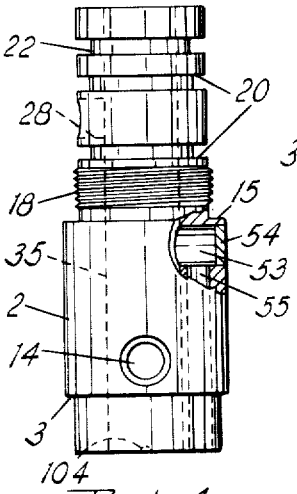
FIG. 4 is a side elevational view partially broken away in cross section of the valve body shown in FIG. 3.

Small ports 104 in FIGS. 1 and 4, and 105 in FIG. 14 vent the bottom of the bore in the valve bodies to prevent pressure differentials being built up by movement of the valve cores which would tend to move the valve cores when the operating handles are released.

What is claimed as new is:

1. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through opposed inlet ports, axially spaced first and second outlet ports formed through opposite sides of said body to said bore and spaced axially from said inlet ports, said outlet ports being angularly displaced by 90° between said inlet ports and located axially on opposite sides of said inlet ports, means on said body for connecting outlet conduits to said outlet ports, a core rotatably and slidably mounted in said bore and having an internal bore closed at its outer and formed therein, axially spaced flow openings formed in aligned relation through one side of said core and spaced equally to the spacing between said outlet ports, an inlet slot opening formed chordally through one side of said core and positioned axially therealong to register axially with said inlet ports when said flow openings are in axial registry with said outlet ports, a pair of O-ring seals positioned in grooves formed around the outside of said core to seal between said core and the bore in said body on opposite sides of said inlet ports, another pair of O-ring seals positioned to seal between said core and the surface of said bore in said body at both ends of said core, means fixedly closing one end of the bore in said body, a bearing block axially fixedly connected to the other end of said body and having a motion limiting connection with said core, said bearing block having an opening receiving said one end of said core, and an operating handle connected to said core through said opening in said bearing block in rotary and axial driving relation to said core, said handle having a cylindrical side wall rotatable therewith and covering said bearing block, said core having a first closure portion opposite said slot therein rotatable with the core into closing relation to either of said inlet ports through a substantial angle of rotation of said core, said core having other closure portion opposite said flow openings therein movable into selective closing relation with said outlet ports through more than 180° of rotation of the core and during part of the port closing rotation of said first closure portion with each of said inlet ports.

2. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through opposed inlet ports, axially spaced first and second outlet ports formed through opposite sides of said body to said bore and spaced axially from said inlet ports, said outlet ports being angularly displaced by 90° between said inlet ports, means on said body for connecting outlet conduits to said outlet ports, a core rotatably and slidably mounted in said bore and having an internal bore closed at both ends formed therein, axially spaced flow openings formed in aligned relation through one side of said core and spaced equally to the spacing between said outlet ports, an inlet slot opening formed chordally through one side of said core and positioned axially therealong to register axially with said inlet ports when said flow openings are in axial registry with said outlet ports, a pair of O-ring seals positioned to seal between said core and the bore in said body on opposite sides of said inlet ports, another O-ring seal positioned to seal between said core and the surface of said bore in said body at one end of said core, means fixedly closing one end of the bore in said body, a bearing block axially fixedly connected to the other end of said body and having a motion limiting connection with said core, said bearing block having an opening receiving said one end of said core, and an operating handle connected to said core in rotary and axial driving relation to said core, said core having a first closure portion opposite said slot therein rotatable with the core into closing relation to either of said inlet ports through a susbtantial angle of rotation of said core, said core having other closure portions opposite said flow openings therein moveable into selective closing relation with said outlet ports through at least 180° of rotation of the core and during part of the port closing rotation of said first closure portion with each of said inlet ports.

3. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through inlet ports open to said bore at the same level, axially spaced first and second outlet ports formed through said body to said bore at angularly spaced points and at a level spaced axially from said inlet ports, said outlet ports being angularly displaced equi-angularly between said inlet ports, means on said body for connecting outlet conduits to said outlet ports, one of said means being a swing faucet sleeved around the outside of said body, a core rotatably and slidably mounted in said bore and having an internal bore closed at both ends formed therein, axially spaced flow openings formed in aligned relation through one side of said core and spaced equally to the spacing between said outlet ports, an inlet slot opening formed chordally through one side of said core and positioned axially therealong to register axially with said inlet ports when said flow openings are positioned in axial registry with said outlet ports, a pair of annular seals positioned to seal between said core and the bore in said body on opposite sides of said inlet ports, another annular seal positioned to seal between said core and the surface of said bore in said body at one end of said core, means fixedly closing one end of the bore in said body, a bearing block axially fixedly connected to the other end of said body and having a motion limiting connection with said core, said bearing block having an opening receiving said one end of said core, and an operating handle connected to said core in rotary and axial driving relation to said core, said core having a first closure portion opposite said slot therein rotatable with the core into closing relation to either of said inlet ports through a substantial angle of rotation of said core, said core having other closure portions opposite said flow openings therein moveable into selective closing relation with said outlet ports through substantial angles of rotation of the core and during part of the port closing rotation of said first closure portion with each of said inlet ports.

4. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through inlet ports open to said bore at the same level, axially spaced first and second outlet ports formed through said body to said bore at angularly spaced points and at a level spaced axially from said inlet ports, said outlet ports being angularly displaced between said inlet ports, a core rotatably and slidably mounted in said bore and having an internal bore closed at both ends formed therein, axially spaced flow openings formed in aligned relation through one side of said core and spaced equally to the spacing between said outlet ports, an inlet slot opening formed chordally through one side of said core and positioned axially therealong to register axially with said inlet ports when said flow openings are positioned in axial registry with said outlet ports, a pair of annular seals positioned to seal between said core and the bore in said body on opposite sides of said inlet ports, another annular seal positioned to seal between said core and the surface of said bore in said body at one end of said core, means fixedly closing one end of the bore in said body, a bearing block axially fixedly connected to the other end of said body and having a motion limiting connection with said core, said bearing block having an opening receiving said one end of said core, and an operating handle connected to said core in rotary and axial driving relation to said core, said core having a first closure portion opposite said slot therein rotatable with the core into closing relation to either of said inlet ports through a substantial angle of rotation of said core, said core having other closure portions opposite said flow openings therein moveable into selective closing relation with said outlet ports through substantial angles of rotation of the core and during part of the port closing rotation of said first closure portion with each of said inlet ports.

5. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through inlet ports at the same level, a first pair of axially spaced first and second outlet port openings formed through said body to said bore and spaced axially from said inlet ports, said outlet port openings being angularly displaced by 90° from said inlet ports, means on said body for connecting outlet conduits to said outlet port openings, a core rotatably and slidably mounted in said bore and having an internal bore closed at both ends formed therein, a second pair of axially spaced flow openings formed through said core and axially spaced equally to the spacing between said outlet ports, the openings of one of said pairs of openings being positioned in the same side of the part in which they are formed and the other of said pair of openings being formed in opposite sides of the part in which they are formed, an inlet slot opening formed chordally through one side of said core and positioned axially therealong to register axially with said inlet ports when said flow openings are in axial registry with said outlet ports, a pair of annular seals positioned to seal between said core and the bore in said body on opposite sides of said inlet ports, another annular seal positioned to seal between said core and the surface of said bore in said body at one end of said core, means fixedly closing one end of the bore in said body, a bearing block axially fixedly connected to the other end of said body and having a motion limiting connection with said core, said bearing block having an opening receiving said one end of said core, and an operating handle connected to said core in rotary and axial driving relation to said core, said core having a first closure portion opposite said slot therein rotatable with the core into closing relation to either of said inlet ports through a substantial angle of rotation of said core, said core having other closure portions opposite said flow openings therein moveable into selective closing relation with said outlet port openings through at least 180° of rotation of the core and during part of the port closing rotation of said first closure portion with each of said inlet ports.

6. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through inlet ports at the same level, a first pair of axially spaced first and second outlet port openings formed through said body to said bore and spaced axially from said inlet ports, said outlet port openings being angularly displaced from said inlet ports, means on said body for connecting outlet conduits to said outlet port openings, a core rotatably and slidably mounted in said bore and having an internal bore closed at both ends formed therein, a second pair of axially spaced flow openings formed through said core and axially spaced equally to the spacing between said outlet ports, the openings of one of said pairs of openings being positioned in the same side of the part in which they are formed and the other of said pair of openings being formed in opposite sides of the part in which they are formed, an inlet slot opening formed chordally through one side of said core and positioned axially therealong to register axially with said inlet ports when said flow openings are in axial registry with said outlet ports, a pair of annular seals positioned to seal between said core and the bore in said body on opposite sides of said inlet ports, another annular seal positioned to seal between said core and the surface of said bore in said body at one end of said core, means fixedly closing one end of the bore in said body, a bearing block axially fixedly connected to the other end of said body and having a motion limiting connection with said core, said bearing block having an opening receiving said one end of said core, and an operating handle connected to said core in rotary and axial driving relation to said core, said core having a first closure portion opposite said slot therein rotatable with the core into closing relation to either of said inlet ports through a substantial angle of rotation of said core, said core having other closure portions opposite said flow openings therein moveable into selective closing relation with said outlet port openings through a substantial angle of rotation of the core and during part of the port closing rotation of said first closure portion with each of said inlet ports.

7. A valve as defined in claim 6 in which said handle is a symmetrical knob secured to the portion of the core that projects through said bearing block.

8. A valve as defined in claim 6 in which said handle is a lever pivoted on said bearing block and having a pin and slot axial driving connection to said core.

9. A mixing and diverting faucet comprising, a tubular body having opposed hot and cold inlet connections thereon intermediate of its ends, the inside of said body being formed as a continuous uniform bore with inlet ports opening thereto from the ends of said connections, first and second outlet ports formed through the sides of said body in axially spaced relation to each other and above said inlet ports and on opposite sides of said body in 90° offset relation to said inlet ports, a downwardly facing shoulder formed on the exterior of said body below said inlet ports, a mounting plate secured against said shoulder and extending laterally therefrom, mounting connectors having externally threaded lower ends extending downwardly through said plate with supply couplings on their lower ends, laterally opening passages formed in the upper ends of said connectors connected by pipes to said inlet connections, nuts on said connectors adapted to clamp said mounting plate to a supporting surface, a downwardly concave escutcheon housing fitting around the edge of said plate and seated against an upwardly facing shoulder formed on said body between said outlet ports with said body projecting thereabove, a threaded section on said body above said upwardly facing shoulder, a nut engaged with said threaded section clamping said escutcheon to said upwardly facing shoulder, a cylindrical outer portion smaller than said threaded section and extending upwardly therefrom with said first outlet port formed through the cylindrical portion, said second outlet port opening outwardly from said bore below said upwardly facing shoulder and said cylindrical portion, a swing faucet having an annular end rotatably and sealing fitted around said cylindrical portion with an internal enlarged flow passage registering with said first outlet port and having a depending skirt surrounding the upper end of said nut, O-ring seals carried in grooves in said body and sealing between said cylindrical portion and the inside of said annular end on opposite sides of said flow passage, an annular groove formed in the exterior of said body above said spout, an inverted cup shaped swivel bearing member fitted around and resting upon the upper end of said body and having at least one chordal slot formed through its side wall opposite said last annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a gasket clamped between said body and said bottom cap sealing the lower end of said bore and defining a hole between said second flow passage and said diverter coupling, a cylindrical core rotatably and slidably sealingly received in said bore and having a slot in its upper end receiving the end of said lever, a pin and slot vertical driving connection formed between said lever and said core, an internal bore in said core closed at both ends, O-ring seals mounted in grooves in the outside of said core sealingly engaged between the core and the bore in said body at the top and bottom of the core, a fifth O-ring seal engageable between said core and said body on the upper side of said inlet ports in a raised off position of said core, a pair of vertically spaced flow openings formed through one side of said core at the same spacing as said outlet ports, said flow openings being spaced equally to the vertical spacing of said outlet ports and diverging radially on the outside to about 72° of the periphery of said core, and a transverse slot formed near the bottom of said core above said fifth seal to open between said inlet ports and the bore in said core when said flow openings are in vertical registry with said outlet ports.

10. A mixing and diverting faucet comprising, a tubular body having opposed hot and cold inlet connections thereon intermediate of its ends, the inside of said body being formed as a continuous uniform bore with inlet ports opening thereto from the ends of said connections, first and second outlet ports formed through the sides of said body in axially spaced relation to each other and above said inlet ports and on opposite sides of said body in 90° offset relation to said inlet ports, a downwardly facing shoulder formed on the exterior of said body below said inlet ports, a mounting plate secured against said shoulder and extending laterally therefrom, mounting connectors having externally threaded lower ends extending downwardly through said plate with supply couplings on their lower ends, laterally opening passages formed in the upper ends of said connectors connected by pipes to said inlet connections, nuts on said connectors adapted to clamp said mounting plate to a supporting surface, a downwardly concave escutcheon housing fitting around the edge of said plate and seated against an upwardly facing shoulder formed on said body between said outlet ports with said body projecting thereabove, a threaded section on said body above said upwardly facing shoulder, a nut engaged with said threaded section clamping said escutcheon to said upwardly facing shoulder, a cylindrical outer portion smaller than said threaded section and extending upwardly therefrom with said first outlet port formed through the cylindrical portion, said second outlet port opening outwardly from said bore below said upwardly facing shoulder and said cylindrical portion, a swing faucet having an annular end rotatably and sealingly fitted around said cylindrical portion with an internal enlarged flow passage registering with said first outlet port and having a depending skirt surrounding the upper end of said nut, annular seals carried in grooves in said body and sealing between said cylindrical portion and the inside of said annular end on opposite sides of said flow passage, an annular groove formed in the exterior of said body above said spout, an inverted cap shaped swivel bearing member fitted around and resting upon the upper end of said body and having at least one chordal slot formed through its side wall opposite said last annular groove, a segmental key in each choral slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a gasket clamped between said body and said bottom cap sealing the lower end of said bore and defining a hole between said second flow passage and said diverter coupling, a cylindrical core rotatably and slidably sealingly received in said bore and having a slot in its upper end receiving the end of said lever, a pin and slot vertical driving connection formed between said lever and said core, an internal bore in said core closed at both ends, annular seals mounted in grooves in the outside of said core sealingly engaged between the core and the bore in said body at the top and bottom of the core, a fifth annular seal engageable between said core and said body on the upper side of said inlet ports in a raised off position of said core, a pair of vertically spaced flow openings formed through one side of said core at the same spacing as said outlet ports, said flow openings being spaced equally to the vertical spacing of said outlet ports and opening radially on the outside through less than 90° and more than 45° of the periphery of said core, and a transverse slot formed near the bottom of said core above said fifth seal to open between said inlet ports and the bore in said core when said flow openings are in vertical registry with said outlet ports.

11. A mixing and diverting faucet comprising, a tubular body having opposed hot and cold inlet connections thereon intermediate of its ends, the inside of said body being formed as a continuous uniform bore with inlet ports opening thereto from the ends of said connections, first and second outlet ports formed through the sides of said body in axially spaced relation to each other and above said inlet ports and on opposite sides of said body in 90° offset relation to said inlet ports, a downwardly facing shoulder formed on the exterior of said body below said inlet ports, a mounting plate secured against said shoulder and extending laterally therefrom, mounting connectors having externally threaded lower ends extending downwardly through said plate with supply couplings on their lower ends, laterally opening passages formed in the upper ends of said connectors connected by pipes to said inlet connections, nuts on said connectors adapted to clamp said mounting plate to a supporting surface, a downwardly concave escutcheon housing fitting around the edge of said plate and seated against an upwardly facing shoulder formed on said body between said outlet ports with said body projecting thereabove, a threaded section on said body above said upwardly facing shoulder, a nut engaged with said threaded section clamping said escutcheon to said upwardly facing shoulder, a cylindrical outer portion smaller than said threaded section and extending upwardly therefrom with said first outlet port formed through the cylindrical portion, said second outlet port opening outwardly from said bore below said upwardly facing shoulder and said cylindrical portion, a swing faucet having an annular end rotatably and sealingly fitted around said cylindrical portion with a flow passage registering with said first outlet port, annular seals sealing between said cylindrical portion and the inside of said annular end on opposite sides of said flow passage, an annular groove formed in the exterior of said body above said spout, an inverted cap shaped swivel bearing member fitted around and resting upon the upper end of said body and having at least one chordal slot formed through its side wall opposite said last annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a gasket clamped between said body and said bottom cap sealing the lower end of said bore and defining a hole between said second flow passage and said diverter coupling, a cylindrical core rotatably and slidably sealingly received in said bore and having a slot in its upper end receiving the end of said lever, a pin and slot vertical driving connection formed between said lever and said core, an internal bore in said core closed at both ends, annular seals sealingly engaged between the core and the bore in said body at the top and bottom of the core, a fifth annular seal engageable between said core and said body on the upper side of said inlet ports in a raised off position of said core, a pair of vertically spaced flow openings formed through one side of said core at the same spacing as said outlet ports, said flow openings being spaced equally to the vertical spacing of said outlet ports and opening radially on the outside through less than 90° and more than 45° of the periphery of said core, and a transverse slot formed near the bottom of said core above said fifth seal to open between said inlet ports and the bore in said core when said flow openings are in vertical registry with said outlet ports.

12. A mixing and diverting faucet comprising, a tubular body having opposed hot and cold inlet connections thereon intermediate of its ends, the inside of said body being formed as a continuous uniform bore with inlet posts opening thereto from the ends of said connections, first and second outlet ports formed through the sides of said body in axially spaced relation to each other and above said inlet ports and on opposite sides of said body in 90° offset relation to said inlet ports, an upwardly facing shoulder formed on said body between said outlet ports with said body projecting thereabove, a threaded section on said body above said upwardly facing shoulder, a nut engaged with said threaded section, a cylindrical outer portion smaller than said threaded section and extending upwardly therefrom with said first outlet port formed through the cylindrical portion, said second outlet port opening outwardly from said bore below said cylindrical portion, a swing faucet having an annular end rotatably and sealingly fitted around said cylindrical portion with a flow passage registering between said faucet and said first outlet port, O-ring seals sealing between said cylindrical portion and the inside of said annular end on opposite sides of said flow passage, an annular groove formed in the exterior of said body above said spout, an inverted cup shaped swivel bearing member fitted around and resting upon the upper end of said body and having at least one chordal slot formed through its side wall opposite said last annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a gasket clamped between said body and said bottom cap sealing the lower end of said bore and defining a hole between said second flow passage and said diverter coupling, a cylindrical core rotatably and slidably sealingly received in said bore and having a slot in its upper end receiving the end of said lever, a pin and slot vertical driving connection formed between said lever and said core, an internal bore in said core closed at both ends, annular seals sealingly engaged between the core and the bore in said body at the top and bottom of the core, a fifth O-ring seal engageable between said core and said body on the upper side of said inlet ports in a raised off position of said core, a pair of vertically spaced flow openings formed through one side of said core at the same spacing as said outlet ports, said flow openings being spaced equally to the vertical spacing of said outlet ports and diverging radially on the outside to the periphery of said core, and a transverse slot formed near the bottom of said core to open between said inlet ports and the bore in said core when said flow openings are in vertical registry with said outlet ports.

13. A mixing and diverting faucet comprising, a tubular body having angularly spaced hot and cold inlet connections thereon at the same level intermediate of its ends, the inside of said body being formed as a continuous uniform bore with inlet ports opening thereto from the ends of said connections, first and second outlet ports formed through the sides of said body in axially spaced relation to each other and above said inlet ports and on opposite sides of said body in angularly offset relation to said inlet ports, an upwardly facing shoulder formed on said body between said outlet ports with said body projecting thereabove, a threaded section on said body above said upwardly facing shoulder, a nut engaged with said threaded section, a cylindrical outer portion smaller than said threaded section and extending upwardly therefrom with said first outlet port formed through the cylindrical portion, said second outlet port opening outwardly from said bore below said cylindrical portion, a swing faucet having an annular end rotatably and sealingly fitted around said cylindrical portion with a flow passage registering between said faucet and said first outlet port, annular seals sealing between said cylindrical portion and the inside of said annular end on opposite sides of said flow passage, an annular groove formed in the exterior of said body above said spout, an inverted cup-shaped swivel bearing member fitted around and resting upon the upper end of said body and having at least one chordal slot formed through its side wall opposite said last annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a closure positioned between said body and said bottom cap sealing the lower end of said bore and defining a hole between said second flow passage and said diverter coupling, a cylindrical core rotatably and slidably sealingly received in said bore and having a slot in its upper end receiving the end of said lever, a pin and slot vertical driving connection formed between said lever and said core, an internal bore in said core closed at both ends, annular seals sealingly engaged between the core and the bore in said body at the top and bottom of the core, a fifth annular seal engageable between said core and said body on the upper side of said inlet ports in a raised off position of said core, a pair of vertically spaced flow openings formed through one side of said core at the same spacing as said outlet ports, said flow opening being spaced equally to the vertical spacing of said outlet ports and opening radially on the outside to the periphery of said core, and transverse slot means formed near the bottom of said core to open between said inlet ports and the bore in said core when said flow openings are in vertical registry with said outlet ports, said outlet ports in said body and said flow openings in said core being angularly positioned in the part in which they are formed so that each flow opening registers with a different one of the outlet ports in different and substantially angularly rotated positions of said core with substantial angular non-communicating flow blocking portions therebetween.

14. A mixing and diverting faucet comprising, a tubular body having angularly spaced hot and cold inlet connections thereon at the same level intermediate of its ends, the inside of said body being formed as a continuous uniform bore with inlet ports opening thereto from the ends of said connections, first and second outlet ports formed through the sides of said body in axially spaced relation to each other and above said inlet ports in angularly offset relation to said inlet ports, an upwardly facing shoulder formed on said body between said outlet ports with said body projecting thereabove, a cylindrical outer portion smaller than said shoulder and extending upwardly therefrom with said first outlet port formed through the cylindrical portion, said second outlet port opening outwardly from said bore below said cylindrical portion, a swing faucet having an annular end rotatably and sealingly fitted around said cylindrical portion with a flow passage registering between said faucet and said first outlet port, annular seals sealing between said cylindrical portion and the inside of said annular end on opposite sides of said flow passage, an annular groove formed in the exterior of said body above said spout, an inverted cup-shaped swivel bearing member fitted around and resting upon the upper end of said body with said end of said spout supported from said shoulder and having at least one chordal slot formed through its side wall opposite said last annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a closure positioned between said body and said bottom cap sealing the lower end of said bore and leaving a hole between said second flow passage and said diverter coupling, a cylindrical core rotatably and slidably sealingly received in said bore and having a slot in its upper end receiving the end of said lever, a pin and slot vertical driving connection formed between said lever and said core, an internal bore in said core closed at its upper end, annular seals sealingly engaged between the core and the bore in said body at the top and bottom of the core, a fifth annular seal engageable between said core and said body on the upper side of said inlet ports in a raised off position of said core, a pair of vertically spaced flow openings formed through said core at the same spacing as said outlet ports, said flow openings being spaced equally to the vertical spacing of said outlet ports and opening radially on the outside to the periphery of said core, and transverse slot means formed near the bottom of said core to open between said inlet ports and the bore in said core when said flow openings are in vertical registry with said outlet ports, said outlet ports in said body and said flow openings in said core being angularly positioned in the part in which they are formed so that each flow opening registers with a different one of the outlet ports in different and substantially angularly rotated positions of said core with substantial angular non-communicating flow blocking portions therebetween.

15. A mixing and diverting faucet comprising, a tubular body having hot and cold inlet connections thereon intermediate of its ends, the inside of said body being formed as a continuous uniform bore with inlet ports opening thereto from the ends of said connections, first and second outlet ports formed through the sides of said body in axially spaced relation to each other and above said inlet ports and on opposite sides of said body in angularly offset spaced relation between said inlet ports, an upwardly facing shoulder formed on said body with said body projecting thereabove, a cylindrical outer portion smaller than said shoulder extending upwardly therefrom with said first outlet port formed through the cylindrical portion, said second outlet port opening outwardly from said bore, a swing faucet having an annular end rotatably and sealingly fitted around said cylindrical portion with a flow passage registering between said faucet and said first outlet port, annular seals sealing between said cylindrical portion and the inside of said annular end on opposite sides of said flow passage, an annular groove formed in the exterior of said body above said spout, an inverted cup shaped swivel bearing member fitted around and resting upon the upper end of said body and having at least one chordal slot formed through its side wall opposite said last annular groove, a segmental key in each chordal slot projecting into said groove in said body, said bearing member holding said faucet against said shoulder, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a closure positioned between said body and said bottom cap sealing the lower end of said bore and defining a hole between said second flow passage and said diverter coupling, a cylindrical core rotatably and slidably sealingly received in said bore and having a slot in its upper end receiving the end of said lever, a vertical driving connection formed between said lever and said core, an internal bore in said core closed at its upper end, annular seals sealingly engaged between the core and the bore in said body at the top and bottom of the core, a fifth seal engageable between said core and said body on the upper side of said inlet ports in a raised off position of said core, a pair of vertically spaced flow openings formed through one side of said core at the same spacing as said outlet ports, said flow openings being spaced equally to the vertical spacing of said outlet ports and diverging radially on the outside to the periphery of said core, and transverse opening forming means formed in said core to open selectively and variably between said inlet ports and the bore in said core when said flow openings are in vertical registry with said outlet ports.

16. A mixing and diverting faucet comprising, a tubular body having hot and cold inlet connections thereon intermediate of its ends, the inside of said body being formed as a continuous uniform bore with inlet ports opening thereto from the ends of said connections, first and second outlet ports formed through the sides of said body in axially spaced relation to said inlet ports and on opposite sides of said body in angularly offset spaced relation between said inlet ports, an upwardly facing shoulder formed on said body with said body projecting thereabove, a cylindrical outer portion smaller than said shoulder extending upwardly therefrom with said first outlet port formed through the cylindrical portion, said second outlet port opening outwardly from said bore, a swing faucet having an annular end rotatably and sealingly fitted around said cylindrical portion with a flow passage registering between said faucet and said first outlet port, annular seals sealing between said cylindrical portion and the inside of said annular end on opposite sides of said flow passage, an annular groove formed in the exterior of said body above said spout, an inverted cup-shaped swivel bearing member fitted around and resting upon the upper end of said body and having at least one chordal slot formed through its side wall opposite said last annular groove, a segmental key in each chordal slot projecting into said groove in said body, said bearing member holding said faucet against said shoulder, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, a bottom cap secured to the bottom of said body over the bottom of said bore and said second flow passage and having a diverter coupling adapted to receive a diverted flow conduit, a closure positioned between said body and said bottom cap sealing the lower end of said bore and defining a hole between said second flow passage and said diverter coupling, a cylindrical core rotatably and slidably sealingly received in said bore and having a slot in its upper end receiving the end of said lever, a vertical driving connection formed between said lever and said core, an internal bore in aid core closed at its upper end, annular seals sealingly engaged between the core and the bore in said body at the top and bottom of the core, a fifth seal engageable between said core and said body on the upper side of said inlet ports in a raised off position of said core, a pair of flow openings formed through one side of said core, said flow openings radially on the outside to the periphery of said core, and transverse opening forming means formed in said core to open selectively and variably between said inlet ports and the bore in said core when said flow openings are in vertical registry with said outlet ports.

17. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through spaced inlet ports, spaced first and second outlet ports formed through the sides of said body to said bore and spaced axially from said inlet ports, said outlet ports being angularly displaced by 90° between said inlet ports and located axially on opposite sides of said inlet ports, means on said body for connecting outlet conduits to said outlet ports, a core rotatably and slidably mounted in said bore and having an internal bore formed therein, means closing the ends of said bore in said core, spaced flow openings formed in aligned relation through one side of said core and spaced equally to the spacing between said outlet ports, means formed in said core forming openings positioned to register variably with said inlet ports when said flow openings are in registry with said outlet ports, a pair of annular seals positioned to seal between the outside of said core and the bore in said body on opposite sides of said inlet ports in the off position of said core, another pair of annular seals positioned to seal between said core and the surface of said bore in said body at both ends of said core, means fixedly closing one end of the bore in said body, a bearing block axially fixedly connected to the other end of said body and having a motion limiting connection with said core, said bearing block having an opening receiving said one end of said core, and an operating handle connected to said core through said opening in said bearing block in rotary and axial driving relation to said core, said core having a first closure portion opposite said opening forming means therein rotatable with the core into closing relation to either of said inlet parts through a substantial angle of rotation of said core, said core having other closure portions opposite said flow openings therein moveable into selective closing relation with said outlet ports through substantial angles of rotation of the core and during part of the port closing rotation of said first closure portion with each of said inlet ports.

18. A mixing and diverting valve comprising, a tubular body having a cylindrical bore therethrough, an external shoulder on said body with a thread and nut adjacent thereto for clamping the body intermediate of its ends to a surrounding plate, hot and cold supply connections on said body opening to said bore through spaced inlet ports, spaced first and second outlet ports formed through the sides of said body to said bore, means on said body for connecting outlet conduits to said outlet ports, a core rotatably and slidably mounted in said bore and having an internal bore formed therein, means closing the ends of said bore in said core, spaced flow openings formed through said core, means formed in said core forming openings positioned to register variably with said inlet ports when said flow openings are in registry with said outlet ports, annular seals positioned to seal between the outside of said core and the bore in said body on opposite sides of said inlet ports in the off position of said core, a pair of annular seals positioned to seal between said core and the surface of said bore in said body at both ends of said core, a bearing block axially fixedly connected to the one end of said body and having a motion limiting connection with said core, said bearing block having an opening receiving said one end of said core, and an operating handle connected to said core through said opening in said bearing block in rotary and axial driving relation to said core, said core having a first closure portion associated with said opening forming therein moveable with the core into closing relation to either of said inlet ports through a substantial range of motion of said core, said core having other closure portions opposite said flow openings therein moveable into selective closing relation with said outlet ports through substantial range of motion of the core and during part of the port closing motion of said first closure portion with each of said inlet ports.

19. A mixing and diverting faucet comprising, a tubular body having spaced hot and cold inlet connections thereon intermediate of its ends, the inside of said body being formed as a continuous uniform bore with inlet ports opening thereto from the ends of said connections, first and second outlet ports formed through the sides of said body in spaced relation to each other and above said inlet ports and in offset relation to said inlet ports, a downwardly facing shoulder formed on the exterior of said body below said inlet ports and adapted to be secured to a mounting plate, a cylindrical outer portion extending upwardly from said shoulder with said first outlet port formed through the cylindrical portion, a swing faucet having an annular end rotatably and sealingly fitted around said cylindrical portion, means forming an enlarged flow passage registering between said first outlet port and said faucet, annular seals carried between said cylindrical portion and the inside of said annular end on opposite sides of said flow passage, an annular groove formed in the exterior of said body above said spout, an inverted cup shaped swivel bearing member fitted around and resting upon the upper end of said body and having at least one chordal slot formed through its side wall opposite said annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, means for securing a diverted flow conduit to the bottom of said body in communication with said second flow passage, a cylindrical core rotatably and slidably sealingly received in said bore and having a slot in its upper end receiving the end of said lever, means forming a vertical driving connection between said lever and said core, an internal bore in said core closed at both ends, annular seals sealingly engaged between the core and the bore in said body at the top and bottom of the core, another seal engageable between said core and said body on the upper side of said inlet ports in a raised off position of said core, a pair of spaced flow openings formed through the side of said core, and means formed through the side of said core above said other seal to open variably between said inlet ports and the bore in said core when said flow openings are in registry with said outlet ports, said flow openings in said core being spaced therein to register alternatively with said outlet ports at opposite extremes of one adjustment of said core with non-registering flow stopping portions on the core and body therebetween, said flow openings and said last means formed through the side of said core being moveable between opposite extremes of another adjustment of said core into and out of positions registerable with said inlet and outlet ports by the said one adjustment of said core.

20. A mixing and diverting faucet comprising, a tubular body having spaced hot and cold inlet connections thereon intermediate of its ends, the inside of said body being formed as a continuous uniform bore with inlet ports opening thereto from the ends of said connections, first and second outlet ports formed through the sides of said body in spaced relation to each other and in offset relation to said inlet ports, a downwardly facing shoulder formed on the exterior of said body and adapted to be secured to a mounting plate, a cylindrical outer portion extending upwardly from said shoulder with said first outlet port formed through the cylindrical portion, a swing faucet having an annular end rotatably and sealingly fitted around said cylindrical portion, means forming an enlarged flow passage registering between said first outlet port and said faucet, annular seals carried between said cylindrical portion and the inside of said annular end on opposite sides of said flow passage, an annular groove formed in the exterior of said body above said spout, an inverted cup-shaped swivel bearing member fitted around and resting upon the upper end of said body and having at least one chordal slot formed through its side wall opposite said annular groove, a segmental key in each chordal slot projecting into said groove in said body, a cap fitting around said bearing member and retaining said keys in said slots, an operating lever pivoted in a vertical radial slot in one side of said bearing member and projecting through a slot formed in the side of said cap, a second flow passage formed vertically from the bottom of said body and communicating with said second outlet port, means for securing a diverted flow conduit to the bottom of said body in communication with said second flow passage, a cylindrical core rotatably and slidably sealingly received in said bore and having a slot in its upper end receiving the end of said lever, means forming a vertical driving connection between said lever and said core, an internal bore in said core closed at both ends, annular seals sealingly engaged between the core and the bore in said body at the top and bottom of the core, another seal engageable between said core and said body between said inlet ports and said outlet ports in the off position of said core, a pair of spaced flow openings formed through the side of said core, and means formed through the side of said core above said other seal to open variably between said inlet ports and the bore in said core when said flow openings are in registry with said outlet ports, said flow openings in said core being spaced therein to register alternatively with said outlet ports at opposite extremes of one adjustment of said core with non-registering flow stopping portions on the core and body therebetween, said flow openings and said last means formed through the side of said core being moveable between opposite extremes of another adjustment of said core into and out of positions registerable with said inlet and outlet ports by the said one adjustment of said core.

*21. A mixing and diverting valve comprising,*

*a body having a cylindrical bore formed longitudinally therein,*

*an external shoulder on said body with a thread and nut on the body adjacent the shoulder for clamping the body to a surrounding plate,*

*hot and cold supply connections on said body opening to said bore near one end thereof through diametrically opposite angularly spaced inlet ports located at the same axial position along said bore,*

*first and second outlet ports formed through opposite sides of said body in symmetrically angularly spaced alternating relation between said inlet ports to said bore and spaced axially from said supply connections,*

*outlet connections on said body for connecting outlet conduits to said outlet ports,*

*a core rotatably and slidably mounted in said bore and having an internal bore formed therein,*

*means closing the ends of said internal bore in said core,*

*said core having a flow opening formed therein from said internal bore to the outside of said core,*

*said core defining a transverse passage communicating with said flow opening with a portion of the exterior of the core extending arcuately as a blocking wall between the ends of the passage and with the passage axially positioned to register variably with said inlet ports when said flow opening is in registry with either of said outlet ports,*

*a pair of annular seals positioned to seal between the outside of said core and the bore in said body on axially opposite sides of said inlet ports when said core is moved axially to move said passage out of registry with said inlet ports,*

*another pair of annular seals positioned to seal between the outside of said core and the inside of said bore in said body at the ends of the bore in the body,*

*a block axially fixedly connected to said body at said opposite end of said bore from said supply connections and having an opening therein receiving one end of said core,*

*a handle removably and rotatably and axially drivingly conected to the end of said core,*

*and means coacting between said block and said core limiting axial movement of said core outwardly of said body.*

*22. A mixing and diverting valve comprising,*

*a body having a cylindrical bore formed longitudinally therein,*

*an external shoulder on said body with a thread and nut on the body adjacent the shoulder for clamping the body to a surrounding plate,*

*hot and cold supply connections on said body opening to said bore near one end thereof through angularly spaced inlet ports located at the same axial position along said bore,*

*first and second outlet ports formed through opposite sides of said body in symmetrically angularly spaced alternating relation between said inlet ports to said bore,*

*outlet connections on said body for connecting outlet conduits to said outlet ports,*

*a core rotatably and slidably mounted in said bore,*

*said core having a flow opening formed therein,*

*said core defining a transverse passage communicating with said flow opening with a portion of the exterior of the core extending arcuately as a blocking wall between the ends of the passage and with the passage axially positioned to register variably with said inlet ports when said flow opening is in registry with either of said outlet ports,*

*a pair of annular seals positioned to seal between the outside of said core and the bore in said body on axially opposite sides of said inlet ports when said core is moved axially to move said passage out of registry with said inlet ports,*

*another annular seal positioned to seal between the outside of said core and the inside of said bore in said body at the end of the bore in the body at the axially opposite side of said inlet ports from said pair of seals when said passage is moved into axial registry with said inlet ports,*

*a block axially fixedly connected to said body at said opposite end of said bore from said supply connections and having an opening therein receiving an end of said core,*

*a handle removably and rotatably and axially drivingly connected to the end of said core,*

*and means coacting between said block and said core limiting axial movement of said core outwardly of said body.*

References Cited by the Examiner

The following references, cited by the Examiner, are of record in the patented file of this patent or the original patent.

UNITED STATES PATENTS

| | | | |
|---|---|---|---|
| 2,847,027 | 8/1958 | Kumpman | 137—625.17 |
| 2,977,988 | 4/1961 | Drobilits et al. | 137—625.17 |
| 3,026,907 | 3/1962 | Klingler | 137—625.17 |
| 3,103,231 | 9/1963 | Moen | 137—625.17 |

M. CARY NELSON, *Primary Examiner.*

W. CLINE, *Assistant Examiner.*